Sept. 15, 1959
W. REICHELT
2,904,452
OXIDE COATING
Filed April 16, 1956
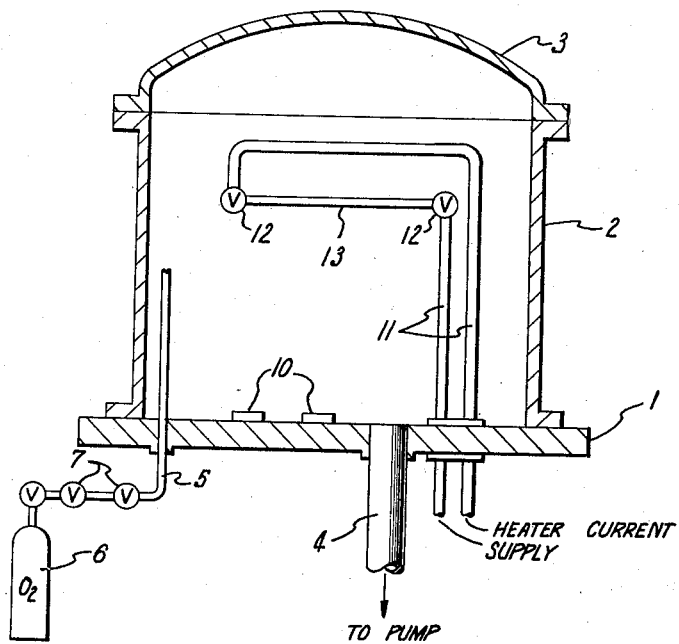
INVENTOR.
WALTER REICHELT
BY Christie, Parker & Hale
ATTORNEYS United States Patent Office 2,904,452
Patented Sept. 15, 1959

2,904,452

OXIDE COATING

Walter Reichelt, Hanau am Main, Germany, assignor to W. C. Heraeus, G.m.b.H., Hanau, Germany Application April 16, 1956, Serial No. 578,187

2 Claims. (Cl. 117—106)

This invention relates to the deposition of oxide coatings by evaporation and condensation on a backing material or "substrate."

Various types of oxide coatings are deposited on objects to give the surface of the object a high chemical resistance, or greater mechanical strength, or both. For example, oxide coatings are applied to the cutting edges of precision tools and to other such areas which are subject to wear. Mirrors and other optical elements are also protected by oxide coatings.

In the past attempts have been made to evaporate the oxide and deposit it by condensation on a substrate. The difficulty with this procedure is that many of the oxides which are of commercial importance boil or sublime only at very high temperatures and are therefore difficult to handle. Moreover, these oxides dissociate at the temperatures required for boiling or sublimation, and such dissociation forms impurities which contaminate the layers condensed on the substrate. As a consequence, such coatings fail to meet the high standards required in many applications, for example in coating optical elements.

In an attempt to avoid the difficulty encountered when oxides are evaporated directly, a cumbersome process has been used in which a pure metal is deposited by evaporation and condensation on a substrate. The coated substrate is then heated in the presence of air or oxygen in an attempt to form a satisfactory oxide coating of the deposited material. This treatment does form oxides in the deposited layers, but this transformation is neither uniform nor complete, and such layers which are permeable or porous due to the presence of small "pin holes," fail to meet the usual high coating standards concerning chemical, mechanical, or optical properties. Furthermore, not all types of substrates can be subjected to the temperatures required for oxidation of the deposited material without thermal decomposition of the substrate.

This invention provides a process for oxide coating which is conducted at relatively low temperatures and which does not require a destructive heating of the substrate. The oxide coating produced with the method of this invention is condensed on the substrate in very pure form and is highly impervious. Layers formed in accordance with this invention have a good chemical resistance, high mechanical strength, excellent optical properties, and are harder than glass. Moreover, the process produces a pure oxide coating in a relatively short time.

Briefly, the invention contemplates the process for providing an object with an oxide coating in which a material, which may be either the oxide itself, or an element which will combine with oxygen to form the desired oxide, is disposed in an enclosed chamber with the object to be coated. The material is heated to a temperature below its melting point and a substantially pure oxygen atmosphere is maintained in the chamber at a subatmospheric pressure. The heated material apparently is affected by the presence of oxygen so that it evaporates much faster than would be normally expected on the basis of the vapor pressure of the material at the temperature employed, and forms a high quality oxide coating on the object to be coated.

The unexpected evaporation of the material or element at a rate much greater than would be expected on the basis of the vapor pressure of the element at the temperature employed results in the formation of an oxide coating at a surprisingly high rate. Although the explanation of the phenomenon is not fully understood, it is likely that the reactiton takes place in several steps. Apparently, with the case of the evaporation of an element, such as tantalum, the oxygen is first adsorbed on the surface of the heated element to cause a weakening of the atomic lattice in the element and lead to the formation of relatively volatile, low valence oxides. These oxides, while in the gaseous state, undergo further reactions with oxygen and are changed to high valence oxides which then condense on the cooler surface of the nearby substrate.

With the evaporation of the oxide itself, the oxide probably dissociates into low valence oxides of relatively high volatility, which, in the gaseous state, react with the pure oxygen to be reconverted into less volatile oxides of higher valence which condense on the substrate.

Suitable apparatus for carrying out the method of the present invention is shown in the single figure of the drawing.

As shown in the drawing, the apparatus may comprise a base plate 1, with an enclosing chamber formed by a cylindrical wall section 2 and a cover 3, the resulting enclosed space being evacuated by a suitable vacuum pump (not shown) through a pipe 4 extending through the base 1. Oxygen is admitted through a pipe 5 extending through the base plate 1, an oxygen tank 6, being connected through suitable pressure-reducing and cut-off valves indicated at 7. The items to be coated, indicated at 10, may be placed in the bottom of the chamber on the base plate 1, or other suitable means may be provided as required to mount the items 10 in the evaporation chamber.

In a preferred form of the invention the material which is oxidized is a metal in elemental form, and is heated slowly to a relatively low temperature well below its melting or softening point. Therefore, the metal may be used in the form of a wire, strip, or sheet 13 which may be stretched between two electric terminal posts or electrodes 12 and without intermediate support. With this arrangement, the metal is heated directly by passing an electric current through it as by means of electric leads 11. Although at the temperature employed the vapor pressure of the material is normally relatively low, the process forms oxide layers at a surprisingly high rate, apparently for the reasons given above.

By connecting the metal between two posts and eliminating intermediate supports, many difficulties are eliminated which are usually encountered when crucibles are used for the evaporation of materials. For example, there is no problem of insufficient wetting of a crucible by molten metal which would result in poor heat transmission; nor is there the formation of an alloy with the crucible metal which frequently leads to breakage of the crucible, and finally there is no problem of evaporation of the crucible material as a contaminant.

Also in the preferred form of the invention, the pressure in the coating chamber is maintained at about $10^{-2}$ to $10^{-4}$ mm. of Hg and preferably between $5 \times 10^{-3}$ to $10^{-4}$ mm. of Hg. Improved results are also obtained if a pure stream of oxygen is slowly and continuously supplied to the coating chamber.

Preferably the operating temperatures are between 1000° C. and 1500° C., and particularly between 1100° C. and 1400° C. for metals or materials having a melting point above 1500° C. and 1400° C. respectively, some of which are specifically set forth later in the disclosure.

The invention will be more fully understood from the following specific examples which illustrate the importance of an atmosphere of pure oxygen in carrying out the process of this invention.

*Example I*

In an attempt to form a tantalum oxide coating on a substrate without practicing the present invention, a strip of tantalum was heated to a temperature of 2000° C. to 2500° C. at a pressure of $10^{-3}$ mm. of Hg, in an atmosphere having the same composition as air. Even after an extended period of time there was scarcely any deposit of tantalum or tantalum oxide on the substrate, and the weight of the tantalum sample had not measurably decreased.

*Example II*

In coating a substrate with tantalum oxide in accordance with this invention, a strip of tantalum was heated to a temperature of only 1100° C. to 1400° C. in pure oxygen at a pressure of $10^{-3}$ mm. of Hg. In a relatively short period of time a high quality tantalum oxide coating was formed on the substrate, and the loss in the weight of the tantalum sample was appreciably greater than would be expected on the basis of the vapor pressure of the tantalum at the temperature employed.

The process of the invention has been used with many different metals, and is particularly useful in forming coatings of oxides of platinum and the metals in the side series of groups 4 through 6, inclusive, of the periodic table, e.g., metals such as titanium, zirconium, thorium, vanadium, tantalum, chromium, tungsten, and molybdenum.

Prior to this invention there were great technical difficulties in obtaining high quality oxide coatings of titanium, thorium and zirconium because of the high melting and boiling points of these elements and their oxides. However, deposits of oxides of these metals made in accordance with this inveniton show perfect transparency and also have great hardness, adhere well to the substrate, and are free from pores so that they are very valuable for their optical as well as mechanical properties.

With the process of this invention the oxygen should not be introduced to the coating chamber too rapidly, the rate depending on the evaporation or sublimation of the metal. The optimum rate for adding oxygen may readily be determined by a few trial runs. The formation of the oxide coating may be continued indefinitely if the temperature of the metal is kept within the previously mentioned range and oxygen is added at a rate to maintain the pressure in the previously mentioned ranges. Thus, the process of this invention permits the deposit of an oxide coating in layers ranging from a thickness of a few angstroms up to several microns.

Another surprising result with this invention is the discovery that pure oxides of the aforementioned metals can be evaporated and deposited on the substrate in accordance with this invention. The deposits so formed show no turbidity, discoloration or any other evidence of contamination from products of dissociation. The necessary temperature to achieve the coating is far below the melting or sublimation point of the oxide. Apparently the oxygen causes the oxide first to dissociate into relatively high volatile oxides of low valence, and in the presence of pure oxygen these volatile low valence oxides are reconverted into oxides of high valence which then condense on the substrate.

As mentioned in the beginning, this invention has the advantage that the objects to be coated need not be heated to high temperatures. However, a slight heating of the objects to be coated increases the adhesion of the coating on the substrate. On the other hand, even if the temperature of the substrate is raised to that required for the oxidation of the metal, the properties of the coating are not noticeably improved. Consequently, it is not necessary to heat the substrate to a high value, and in fact it is preferable to refrain from excessive heating of the substrate whenever there is any possibility that it may be damaged by using heat.

The invention also provides for deposits of pure, clear mixtures of oxides by the simultaneous evaporation of several metals or oxides. Such mixtures of oxide deposits are frequently required for many optical purposes. For example, high quality, transparent mixed oxide deposits are of importance when reflection is to be reduced. These oxides may also be used advantageously as absorbing coatings for sun glasses, and for glasses which are to protect eyes against glare.

In the optical field, the process of this invention meets urgent demands. The products of interference light filters, for example, require layers of high refractive index, such as a titanium oxide layer. Because of the above described difficulties with previous processes, it was impossible, prior to this invention, to deposit suitable oxides, such as titanium oxide, to meet the high optical standards.

The new process also solves the problem of coating various materials, for example, plastic, with pure oxide so that decorative coloring effects are obtained due to the light interference patterns formed on the surface of the coated material. The process is particularly useful in that the plastic substrate need not be heated and the oxide coating adheres very well to the plastic substrate.

I claim:

1. The method of coating an object with an oxide of a metal selected from the group consisting of titanium, zirconium, thorium, vanadium, tantalum, chromium, tungsten and molybdenum comprising the steps of disposing the object to be coated in a chamber, securing the metal between two spaced electrodes in the chamber, evacuating the chamber, maintaining a continuous flow of pure oxygen through the chamber in the pressure range of $10^{-4}$ to $10^{-2}$ mm. of Hg, passing a current through the electrodes and the metal to heat the metal, and setting the current at a level which maintains the temperature of the metal below the melting point, whereby the metal is maintained in the solid state at an elevated temperature during the coating process.

2. The method of coating an object with an oxide of a metal selected from the group consisting of titanium, zirconium, thorium, vanadium, tantalum, chromium, tungsten and molybdenum, comprising the steps of disposing a piece of the metal together with the object to be coated in an enclosed region, maintaining an atmosphere of pure oxygen at a subatmospheric pressure of approximately $10^{-4}$ to $10^{-2}$ mm. of Hg in the enclosed region, and heating and maintaining the metal piece to an elevated temperature but below the melting point of the metal.

References Cited in the file of this patent

UNITED STATES PATENTS

| | | |
|---|---|---|
| 1,497,417 | Weber | June 10, 1924 |
| 2,539,149 | Miller | Jan. 23, 1951 |
| 2,671,739 | Lander | Mar. 9, 1954 |
| 2,784,115 | Brinsmaid et al. | Mar. 5, 1957 |

FOREIGN PATENTS

| | | |
|---|---|---|
| 481,997 | Canada | Mar. 25, 1952 |